June 11, 1940.   R. W. WAGNER   2,204,333
MOWING MACHINE
Filed June 20, 1938   5 Sheets-Sheet 1

FIG. I.

INVENTOR
ROBERT W. WAGNER
BY
ATTORNEYS

June 11, 1940.  R. W. WAGNER  2,204,333
MOWING MACHINE
Filed June 20, 1938   5 Sheets-Sheet 3

INVENTOR
ROBERT W. WAGNER
BY
ATTORNEYS

Patented June 11, 1940

2,204,333

UNITED STATES PATENT OFFICE 2,204,333

MOWING MACHINE

Robert W. Wagner, Detroit, Mich., assignor to Detroit Harvester Company, Detroit, Mich., a corporation of Michigan Application June 20, 1938, Serial No. 214,806

50 Claims. (Cl. 56—25)

The invention relates to mowing machines and refers more particularly to mowing machines in which the cutters are power driven.

The invention has for one of its objects to provide a mowing mechanism which is adapted to be attached to a tractor.

The invention has for another object to permanently operatively support the mowing arm which carries the cutter in such a manner that the arm may be swung in a rearward substantially horizontal direction from its operative cutting position without damage to or breakage of the arm or the supporting means when the arm encounters an obstruction and the arm may subsequently be readily returned to its operative cutting position without the necessity of making adjustments or repairs.

The invention has for still another object to support the mowing arm in relation to the drive shaft for operating the cutter so that the arm may also be swung in a substantially vertical direction to assume various inclined positions, in each of which the cutter is operative. As a result, the mowing mechanism is operative for all practical slopes of the ground relative to the tractor.

The invention has for a further object to carry the mowing arm of the mechanism upon the tractor in a substantially balanced condition so that while its shoes normally rest lightly upon the ground when the arm is in operative cutting position, but very little upward pressure is necessary to raise the arm.

The invention has for a still further object to provide for tilting the mowing arm to position the cutter at various inclinations and thereby vary the height of cut.

The invention has for other objects to provide an improved mechanism for swinging the mowing arm in an upward direction and holding the arm in adjusted position, or allowing the arm to move in a downward direction; and to provide an arm operating mechanism which is driven by the prime mover of the tractor and which is readily controlled by the operator.

The invention has for these and other objects the novel arrangements and combinations of parts and features of construction as more fully hereinafter set forth.

As illustrated in the drawings, 1 is a tractor of a standard make having at its rear end the power take-off 2, which is adapted to be operatively connected to the transmission 3 upon operation of the lever 4. 5 is the mowing mechanism attached to the tractor and forming therewith the mowing machine.

The mowing mechanism comprises the mowing arm 6 carrying the cutter 7, the support 8 for the arm carried by the tractor, the drive mechanism 9 for driving the cutter, and the lifting mechanism 10 for raising the mowing arm from its operative cutting position.

The mowing arm 6 has at its inner and outer ends the inner and outer shoes 11 and 12 respectively, the front ends of which are curved upwardly. The cutter 7 comprises a series of V-shaped knives 13 and is reciprocable longitudinally of the mowing arm.

The support 8 is formed in general of the housing 14 upon which the inner shoe 11 is pivotally mounted, a frame extending between the tractor and the housing, and cable and spring means for yieldably carrying the frame. More in detail, the frame is formed of the rod 15 extending transversely of the tractor and the rod 16 extending generally longitudinally of the tractor. The rod 15 is pivotally mounted at its inner end upon the plate 17 which is secured to the bottom of the tractor. The rod has secured thereto outwardly beyond its inner end the sleeve 18 which is provided with the upwardly extending projection 19 engageable with the bottom of the tractor to limit upward swinging of the rod. 20 is a coil spring encircling the projection and adapted to yieldably resist upward swinging. The rod 16 is sleeved at its front end upon the outer end of the rod 15 and is angularly movably secured at its rear end to the flange 21 which extends transversely from the bracket 22 secured to a side of the tractor. The construction is such that the rod 16 serves to position the rod 15 at right angles to the longitudinal axis of the tractor. The housing 14 is journaled at its front end upon the outer end portion of the rod 15 adjacent its connection to the rod 16. The housing is provided near its rear end and at its inner side with the sheave 23 about which the cable 24 is reeved. This cable is connected at its rear end to the coil spring 25 which is secured to the bracket 26 upon the tractor. The cable extends forwardly from the coil spring over the sheave 27, then downwardly and inwardly over the sheave 23 and then outwardly to the upright 28, which is secured to and extends transversely from the inner end of the mowing arm. The sheave 27 is carried by the bracket 29 mounted upon the tractor. The cable is maintained under tension by the coil spring and the arrangement is such that the major portion of the weight of the mowing arm and its support is carried so that the inner and outer shoes of the mowing arm lightly rest upon the ground and but very little upward pressure is required to raise the shoes.

The mowing arm is connected to its support in such a manner that it may be swung rearwardly in a substantially horizontal direction, as well as upwardly or downwardly in a substantially vertical direction without damaging or breaking the mowing arm or its support, or the connection between the two. In other words, the construction of the connection is such that it is permanently operative and requires no repairs or adjustments to secure the mowing arm in its normal cutting position after it has been swung rearwardly by reason of encountering an obstruction. In detail, the housing 14 is formed at its outer side with the laterally spaced arms 30 and 31 through which the sleeve 32 extends transversely of the mowing arm in its operative cutting position. 33 is a spherical mounting encircling the sleeve and 34 is an upright upon the rear end of the inner shoe engaging this mounting, the construction being such that the rear end of the inner shoe is universally pivoted upon the housing. The housing is provided near its front end, but in rear of the rod 15, with the arcuate bearing 35 in which is longitudinally slidable the arcuate rod 36, the front end of which is located outwardly beyond the arcuate bearing and is pivotally connected to the upright 37 near the front end of the inner shoe. The axes of curvature of both the arcuate bearing and arcuate rod coincides with the axis of the spherical mounting 33. For normally holding the mowing arm in its operative cutting position, there is the detent 38 which is yieldably urged downwardly to engage the notch 39 in the arcuate rod by the coil spring 40, both the detent and coil spring being housed in the housing 14. The notch 39 is located so that when engaged by the detent, the axis of the pivot between the arcuate rod 36 and the upright 37 is coincident or registers with the axis of the sleeve 32 and the mounting 33. As a result, the mowing arm may readily swing upwardly and downwardly about its pivots while cutting. Furthermore, it will be seen that in the event that the mowing arm encounters an obstruction during the forward movement of the machine, it may be swung rearwardly from its operative cutting position without damaging the parts.

For the purpose of limiting the rearward swinging of the mowing arm and absorbing shock, I have provided the coil spring 41 encircling the inner end of the arcuate rod 36 and abutting the collar 42 upon the arcuate rod and adapted to abut the inner side of the arcuate bearing 35.

The driving mechanism 9 for driving the cutter 7 is constructed to provide for both horizontal and vertical movement of the mowing arm and the cutter. 43 is the drive shaft concentric with and journaled in the sleeve 32 so that the axis of the drive shaft is coincident with the axes of the pivots for connecting the mowing arm to the housing. Secured upon the front end of this drive shaft is the fly wheel 44 which is connected to the cutter by the connecting rod 45. The connecting rod is articulated intermediate its ends, it being formed, in effect, of an inner rod 46 journaled upon the crank pin secured to the fly wheel and an outer rod 47 connected to the inner rod by the vertical pivot 48 and connected to the cutter by being journaled upon the spherical mounting 49 upon the pin 50 extending from the upright 51 connected to the cutter. The mounting of the drive shaft with its axis coincident with the axes of the pivots for connecting the mowing arm to its support and the construction of the connecting rod provide for vertical swinging of the mowing arm and the cutter and also horizontal swinging of the mowing arm and cutter without destroying the operative connection between the drive shaft and the cutter. As a result, the construction is operative for all practical slopes of the ground relative to the tractor and also operative in the event that the mowing arm is swung rearwardly relative to the tractor. The drive shaft is driven by the shaft 52 through the universal joint 53 and the shaft 52 is driven by the shaft 54 through the universal joint 55. The shaft 54 is journaled in the auxiliary housing 56 which is carried by the bracket 22. 57 is a pulley upon the shaft 54 to the rear of the auxiliary housing driven from the pulley 58 upon the rear end of the power take-off shaft 59 by the belt 60. It will thus be seen that driving of the cutter is accomplished through the power take-off.

It will be noted that the bracket 22 is longitudinally adjustably secured to the tractor by the cap bolts 61 which extend through longitudinally extending slots 62 in the bracket, whereby the auxiliary transmission housing may be properly located relative to the mowing arm and its supporting housing and the mechanism carried thereby.

For the purpose of controlling the height of cut, I have provided means for angularly adjusting the housing 14 about the frame rod 15 to thereby adjust the tilting of the mowing arm and the cutter. The adjustment means comprises the upright arm 63 upon the housing 14 at its front end and inner side, the rod 64, and the sleeve 65. The latter is longitudinally adjustably mounted upon the rod 16 and is adapted to be secured in the desired position by suitable means, such as the set screw 66. The rod 64 extends between the sleeve and the arm.

Figure 1:
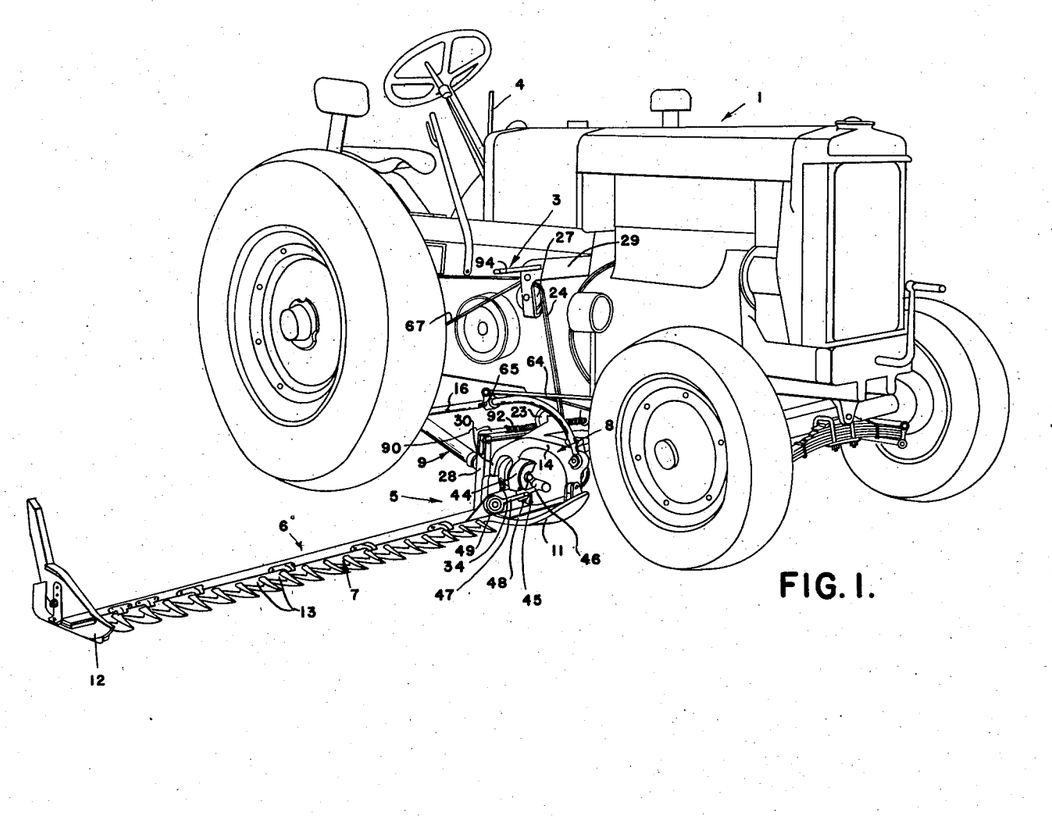
Figure 1 is a perspective view of a mowing machine illustrating an embodiment of my invention.
Figure 2:
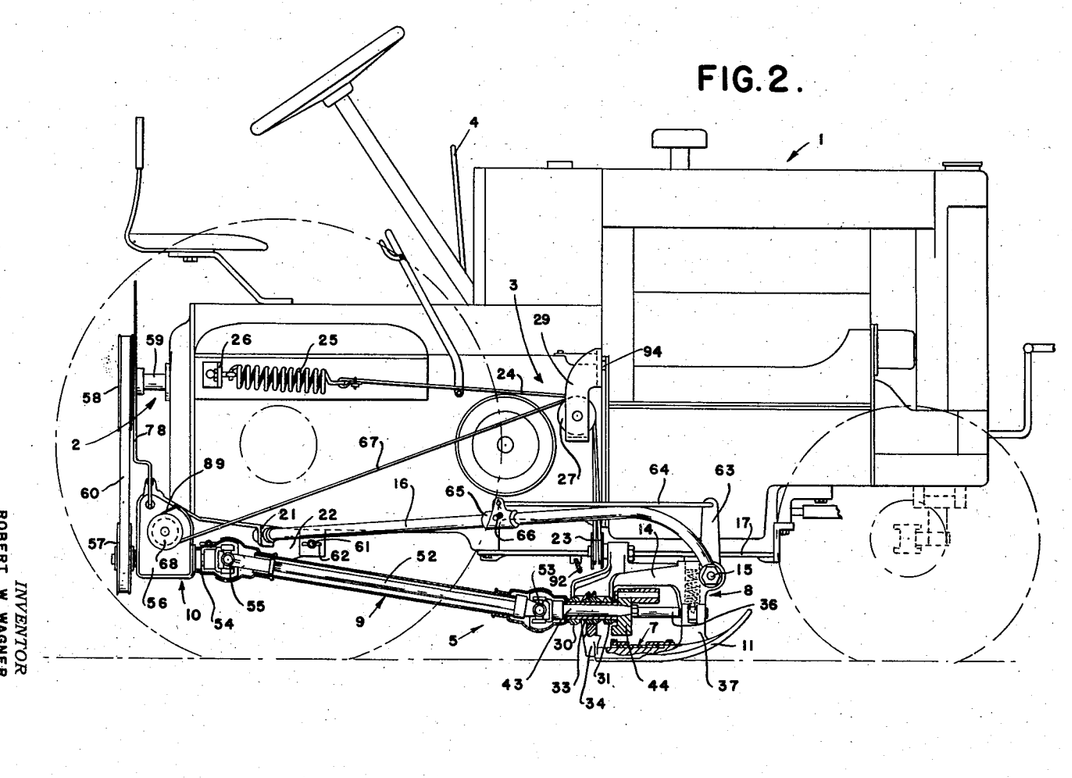
Figure 2 is a side elevation thereof, partly broken away and in section.
Figures 3, 7, 8, 9:
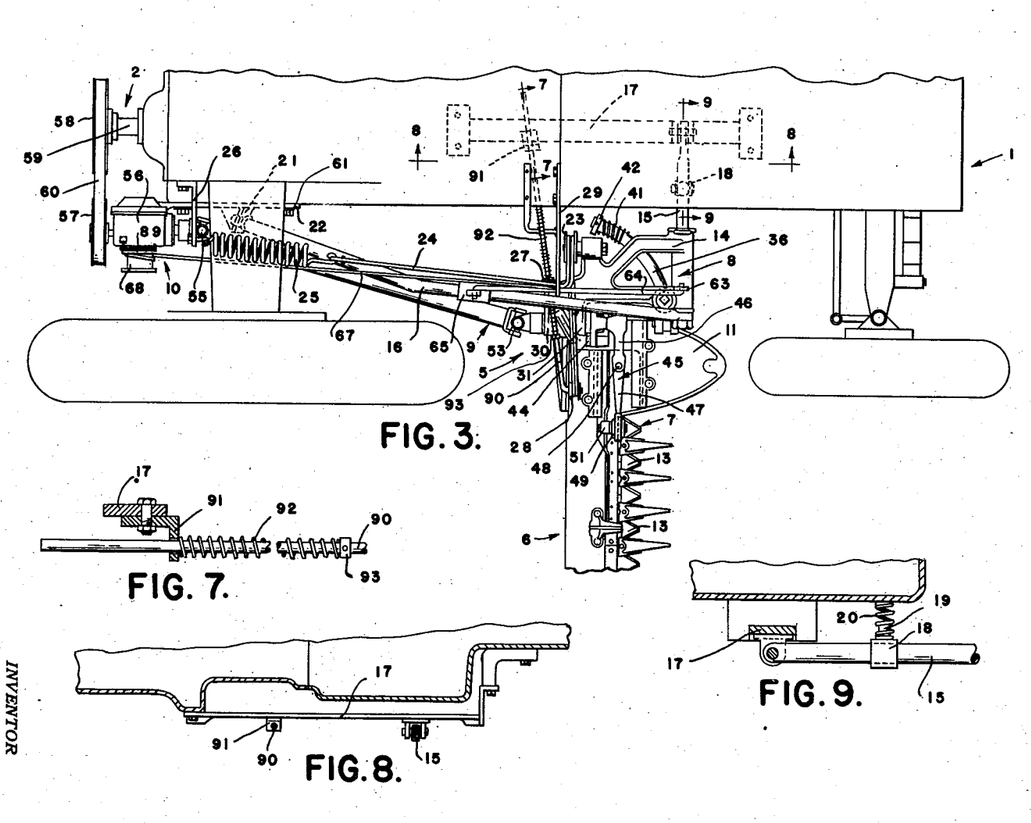
Figure 3 is a plan view thereof with parts of the tractor omitted.
Figures 7, 8 and 9 are cross sections on the lines 7—7, 8—8 and 9—9 respectively of Figure 3.
Figures 4, 6:
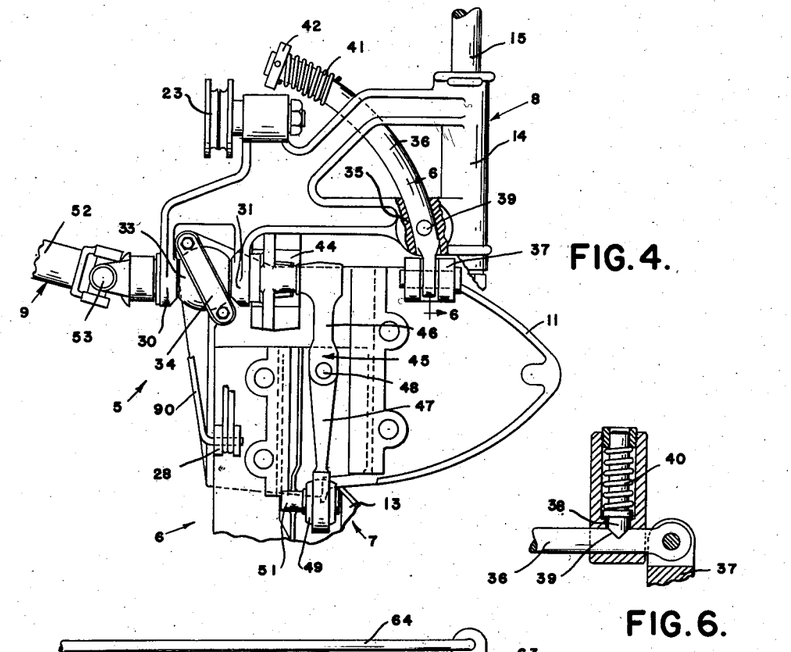
Figure 4 is an enlarged plan view of a portion of Figure 3 with parts omitted.
Figure 6 is a cross section on the line 6—6 of Figure 4.
Figure 5:
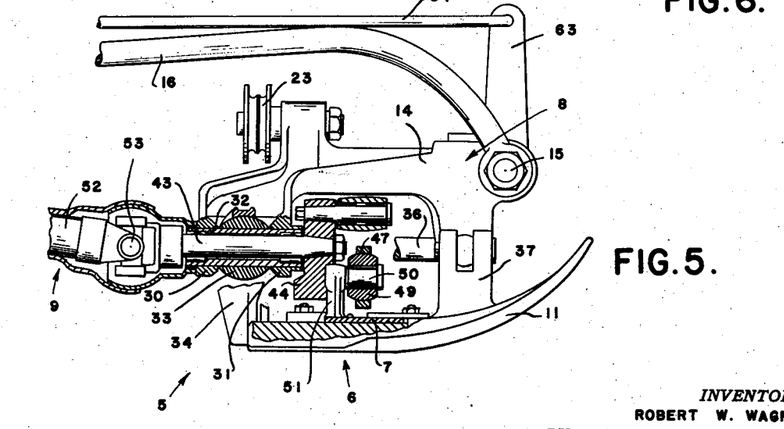
Figure 5 is a side elevation, partly broken away and in section.
Figures 10, 11, 12, 13, 14, 15, 16, 17:
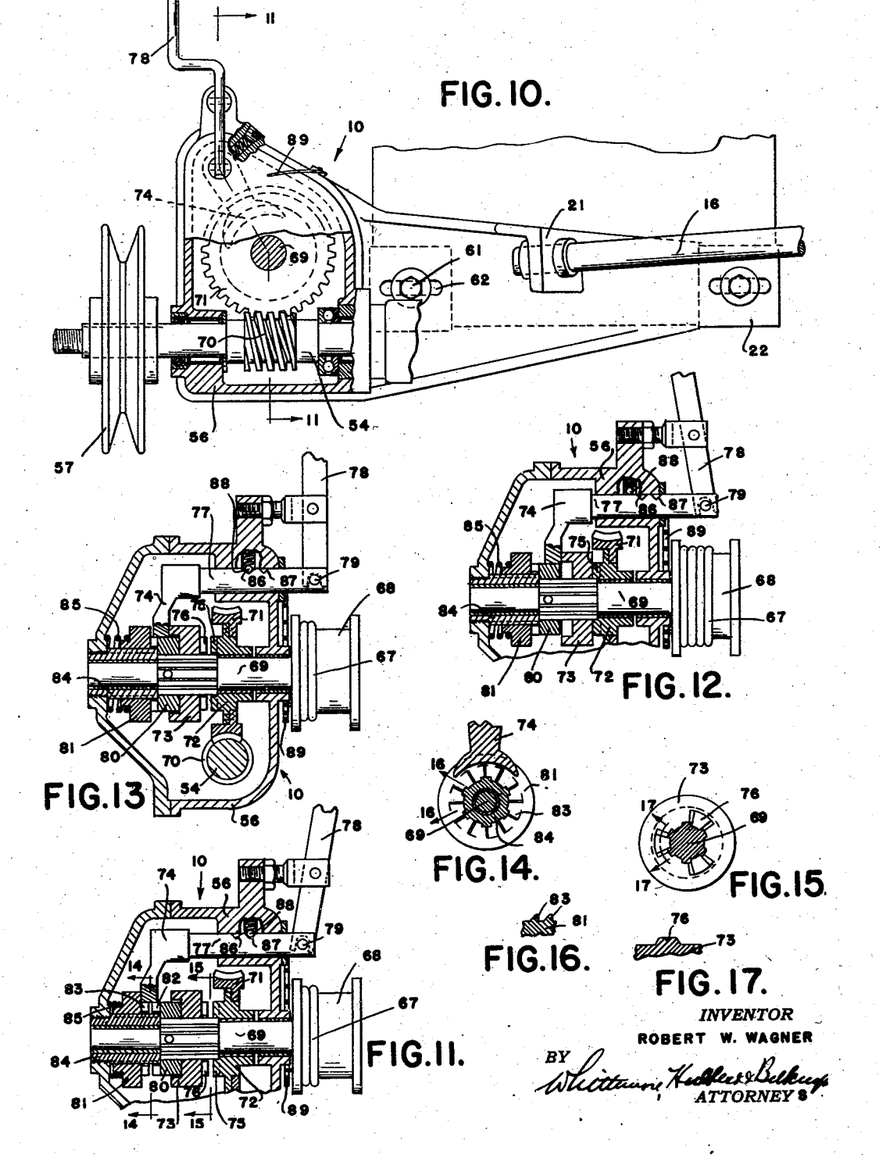
Figure 10 is an enlarged side elevation, partly in section, of a portion of Figure 2.
Figure 11 is a cross section on the line 11—11 of Figure 10.
Figures 12 and 13 are views similar to Figure 11 showing the parts in adjusted positions.
Figures 14 and 15 are cross sections on the lines 14—14 and 15—15 respectively of Figure 11.
Figures 16 and 17 are cross sections on the lines 16—16 of Figure 14 and 17—17 of Figure 15 respectively.

The lifting mechanism 10 for raising the mowing arm from its operative cutting position is power driven. 67 is a cable connected at one end to the upright 28 of the mowing arm, then extending inwardly and reeved about the sheave 23, then extending upwardly and outwardly and reeved about the sheave 27, and then extending downwardly and being connected to the drum 68. The drum is located at the outer side of the auxiliary transmission housing 56 and is secured upon the shaft 69 which extends transversely of and above the shaft 54. The shaft 54, intermediate its bearings in the auxiliary housing is formed with the worm 70 which meshes with the worm wheel 71 carried by the shaft 69. This worm wheel is secured to the driven clutch member 72 which is journaled upon the shaft 69 and is adapted to be engaged by the driving clutch member 73. The latter clutch member is non-rotatably secured to the shaft 69 as by being splined thereto and is adapted to be moved toward and into operative relation with the clutch member 72 by the shifter arm or fork 74. The clutch members 72 and 73 have the cooperable teeth 75 and 76 respectively, the engaging surfaces of which are beveled or inclined. When the teeth are in engagement and the clutch member 73 is driven by the clutch member 72, as illustrated in Figures 12, 15 and 17, a force is produced tending to automatically disengage the teeth and consequently the clutch members. As a result, force must be constantly exerted by the shifter arm 74 upon the driving clutch member 73 to hold the latter in operative engagement with the driven clutch member 72 to drive the drum 68 and thereby wind the cable 67 upon the drum to effect raising of the mowing arm. Furthermore, the force exerted by the shifter arm must be greater than the force tending to separate or disengage the clutch members. The shifter arm is secured upon the inner end of the shifter rod 77 which is slidably mounted in the auxiliary transmission housing 56 and this rod is adapted to be moved longitudinally by means of the lever 78 extending to a position where it may be readily engaged by the operator of the tractor. As shown, the lever is pivotally mounted upon the upper portion of the auxiliary housing and its lower end is bifurcated to embrace the pin 79 upon the outer end of the shifter rod.

For the purpose of holding the drum from rotation in the opposite direction to allow the cable to unwind upon disengagement of the clutch members, I have provided means which is automatically operable. This means comprises the stationary clutch member 80 and the movable clutch member 81 having the cooperable teeth 82 and 83 respectively. The stationary member 80 is rotatable with the shaft 69 and is fixed thereon by being pinned thereto and is of a diameter to clear the shifter arm. The movable clutch member 81 is longitudinally movably and non-rotatably mounted upon the splined sleeve 84 which encircles and is concentric with the shaft 69 and is anchored as by being welded to the end of the auxiliary housing 56. The coil spring 85 between the end of the housing and the movable clutch member tends to force the latter toward the stationary clutch member to hold the two in engagement. The teeth 83 are inclined to permit movement of the teeth 82 thereover while the drum is being rotated in a direction to wind the cable thereon. However, the teeth 83 positively engage the teeth 82 upon tendency of the drum to rotate in the opposite direction so that rotation of the drum in the opposite direction is prevented. Figures 13, 14 and 16 illustrate this construction.

To disengage the movable clutch member 81 from the stationary clutch member 80, the shifter arm 74 may be moved in a direction to engage the movable clutch member and move the same against the effort exerted by the coil spring 85. The parts are at this time in the positions illustrated in Figure 11.

The shifter rod is provided with the notches 86 and 87 which are engageable by the spring pressed ball 88. The notch 86 is positioned so that when it is engaged by the ball, the shifter arm will be held in the position illustrated in Figure 13. The notch 87 is positioned so that when it is engaged by the ball, the shifter arm will be held in the position illustrated in Figure 11, at which time the mowing arm may freely follow the contour of the ground.

To maintain the cable 67 taut for all positions of the mowing arm, I have provided the spiral spring 89 between the auxiliary housing 56 and the pulley 68. The spring is connected at its inner end to the pulley and at its outer end to the housing and exerts a light turning effort upon the drum to wind the cable thereon to take up any slack that might otherwise be produced. The strength of the spring, however, is such that it can not swing the mowing arm upwardly or prevent the mowing arm from moving downwardly.

To limit the effort that can be exerted through the cables 24 and 67 in swinging the mowing arm 6 upwardly from its operative cutting position to substantially vertical position, the upright 28 is secured to the mowing arm in a position such that when the latter is in its substantially vertical position the upright is in alignment with the portions of the cables between the upright and the bottom of the sheave 23.

For the purpose of compensating for the decreasing effort required to swing the mowing arm 6 upwardly from its operative cutting position to substantially vertical position, I have provided spring means for opposing the upward swinging of the mowing arm. This spring means is also adapted to act upon the mowing arm to swing the same downwardly from its substantially vertical position when released. In detail, 90 is a rod connected at its outer end to the free end of the upright 28 and slidably engaging the bracket 91 secured to the plate 17. 92 is a coil spring encircling the rod and abutting the bracket and the collar 93 secured to the rod, the collar being positioned to place the coil spring under compression upon upward swinging of the mowing arm. The outer end of the rod 90 extends transversely between furcations at the free end of the upright 28 and serves to anchor the cables 24 and 67 to the upright. With the above construction, the spring 92 and the mowing arm 6 serve to present a substantially constant load to upward swinging of the mowing arm.

The mowing arm may be held in its substantially vertical position by suitable securing means, such as the hook 94 upon the bracket 29.

What I claim as my invention is:

1. In a mowing machine, a cutter, a pivotal mowing arm carrying said cutter and adapted to be swung rearwardly through a substantially horizontal path, a support, a spherically shaped mounting on said support, means on said arm embracing said mounting, and an arcuate rod longitudinally movably mounted on said support and permanently operatively connected to said arm, said rod having a curvature the axis of which substantially coincides with the axis of said mounting.

2. In a mowing machine, a cutter, a pivotal mowing arm carrying said cutter and adapted to be swung in transverse directions, a support comprising a housing, a spherically shaped mounting on said housing, means on said arm embracing said mounting, and an arcuate rod longitudinally movably mounted on said housing and permanently pivotally connected to said arm, said rod having a curvature the axis of which substantially coincides with the axis of said mounting.

3. In a mowing machine, a cutter, a pivotal mowing arm carrying said cutter and adapted to be swung in transverse directions, a support comprising a housing, a spherically shaped mounting on said housing, means on said arm embracing said mounting, an arcuate rod longitudinally movably mounted on said housing and permanently pivotally connected to said arm, said rod having a curvature centered at said mounting, the axis of its pivotal connection to said arm being at all times in substantial alignment with said mounting.

4. In a mowing machine, a cutter, means comprising a drive shaft operatively connected to said cutter for operating the same, a pivotal mowing arm carrying said cutter and adapted to be swung in transverse directions, a supporting housing for said shaft and arm, and means for mounting said arm on said housing, said means including a mounting upon said housing having a spherically shaped bearing surface for permanent engagement by said arm, said mounting being substantially concentric with the axis of said shaft.

5. In a mowing machine, a tractor, a cutter, a pivotal mowing arm carrying said cutter, a drive shaft operatively connected to said cutter and adapted to be driven from the prime mover of said tractor, a supporting housing for said shaft, a pivotal connection between said housing and arm, a sheave upon said housing, a spring connected to said tractor, a cable connected to said spring and reeved about said sheave and connected to said arm, said cable normally being maintained under tension by said spring and serving to support said arm and housing, and spring means between said tractor and arm and adapted to compensate for the decreasing effort required to swing said arm upwardly.

6. In a mowing machine, a tractor, a cutter, a pivotal mowing arm carrying said cutter, a drive shaft operatively connected to said cutter and adapted to be driven from the prime mover of said tractor, a support for said shaft, a sheave upon said support, a pivotal connection between said support and arm, a spring connected to said tractor, a cable connected to said spring and reeved about said sheave and connected to said arm, said cable being normally maintained under tension by said spring and tending to support said arm and support, spring means between said tractor and arm adapted to compensate for the decreasing effort required to swing said arm upwardly, and a second cable reeved about said sheave and connected to said arm and adapted to be operatively connected to the prime mover of said tractor to swing said arm upwardly about its pivotal connection to said support.

7. In a mowing machine, a tractor having a power take-off, a cutter, a mowing arm carrying said cutter and movable upwardly from cutting position, and means for moving said arm upwardly from cutting position comprising a drum, a cable connected to said arm and adapted to be wound upon said drum, and cooperable clutch members between said power take-off and drum constructed to be relatively moved into and held in engagement by manual pressure and to be automatically relatively moved out of engagement upon release of the manual pressure.

8. In a mowing machine, a tractor having a power take-off, a cutter, a mowing arm carrying said cutter and movable upwardly from cutting position, and means for moving said arm from cutting position comprising a drum, a cable connected to said arm and adapted to be wound upon said drum, cooperable clutch members between said power take-off and drum constructed to be relatively moved and held in engagement by manual pressure and to be automatically relatively moved out of engagement upon release of the manual pressure, said clutch members when in engagement rotating said drum in one direction, and means for automatically holding said drum from rotation in the opposite direction upon disengagement of said clutch members.

9. In a mowing machine, a tractor having a power take-off, a cutter, a mowing arm carrying said cutter and movable upwardly from cutting position, and means for moving said arm from cutting position comprising a drum, a cable connected to said arm and adapted to be wound upon said drum, cooperable clutch members between said power take-off and drum constructed to be relatively moved and held in engagement by manual pressure and to be automatically relatively moved out of engagement upon release of the manual pressure, said clutch members when in engagement rotating said drum in one direction, and manually controlled means adapted to occupy an operative position to automatically hold said drum from rotation in the opposite direction upon disengagement of said clutch members and also adapted to be moved from said operative position to a second position permitting said drum to rotate in the opposite direction upon disengagement of said clutch members.

10. In a mowing machine, a tractor having a power take-off, a cutter, a mowing arm carrying said cutter and movable upwardly from cutting position, a cable connected to said arm, a drum upon which said cable is adapted to be wound, a driven clutch member connected to said drum, a driving clutch member connected to said power take-off, said clutch members having cooperable teeth for driving said driven clutch member from said driving clutch member when in engagement, said teeth being constructed to produce a force tending to automatically disengage said clutch members, and manually operated means for moving one of said clutch members toward the other and for holding said clutch members in engagement.

11. In a mowing machine, a tractor having a power take-off, a cutter, a mowing arm carrying said cutter and movable upwardly from cutting position, a cable connected to said arm, a drum upon which said cable is adapted to be wound, a driven clutch member connected to said drum, a driving clutch member connected to said power take-off, said clutch members having cooperable teeth for driving said driven clutch member from said driving clutch member when in engagement, said teeth being constructed to produce a force tending to automatically disengage said clutch members, said clutch members when in engagement rotating said drum in one direction, means for automatically holding said drum from rotation in the opposite direction upon disengagement of said clutch members, and manually operated means for moving one of said clutch members toward the other and for holding said clutch members in engagement.

12. In a mowing machine, a tractor having a power take-off, a cutter, a mowing arm carrying said cutter and movable upwardly from cutting position, a cable connected to said arm, a shaft connected to said power take-off, a drum upon said shaft and about which said cable is adapted to be wound, a driven clutch member connected to said drum, a driving clutch member connected to said shaft, said clutch members having cooperable teeth for driving said driven clutch member from said driving clutch member when in engagement, said teeth being constructed to produce a force tending to automatically disengage said clutch members, said clutch members when in engagement rotating said drum in one direction, a clutch member fixed upon said shaft, a non-rotatable clutch member yieldably held in engagement with said fixed clutch member for automatically holding said drum from rotation in the opposite direction upon disengagement of said first mentioned clutch members, and manually operated means for moving one of said first mentioned clutch members toward the other and for holding the same in engagement and for moving said non-rotatable clutch member out of engagement with said fixed clutch member.

13. In a mowing machine, a tractor having a power take-off, a cutter, a pivotal mowing arm carrying said cutter, means for supporting said arm upon said tractor providing for vertical movement of said arm relative to said tractor, a drum adapted to be operatively connected to said power take-off, a cable between said drum and arm for swinging the latter upwardly from operative cutting position upon operation of said drum, and a spring connected to said drum for maintaining said cable taut.

14. In a mowing machine, a support having a spherically shaped mounting thereon, a mowing arm having means embracing said mounting to provide relative universal adjustability between said support and said arm, and an arcuate member secured to said arm and extending horizontally about the center of said mounting; said support having an aperture receiving said arcuate member in guiding relation.

15. In a mowing machine, a support having a spherically shaped mounting thereon, a mowing arm having means embracing said mounting to provide relative universal adjustability between said support and said arm, an arcuate member secured to said arm and extending horizontally about the center of said mounting, said support having an aperture receiving said arcuate member in guiding relation, and resilient means cooperating with said support and arcuate member to resist displacement of said arm rearwardly.

16. In a mowing machine, a support having a spherically shaped mounting thereon, a mowing arm having means embracing said mounting to provide relative universal adjustability between said support and said arm, an arcuate member secured to said arm and extending horizontally about the center of said mounting, said support having an aperture receiving said arcuate member in guiding relation, and means normally retaining said arm in laterally extending relation to said machine, said last means comprising a spring pressed detent carried by said support, and a cooperating recess in said arcuate member.

17. In a mowing machine, a support having a spherically shaped mounting thereon, and an arcuate opening therein concentric with said spherical mounting; and a mowing arm having a portion embracing said spherical mounting, and having a horizontally curved arcuate member engaging the arcuate opening concentric with said spherical mounting, said arcuate member being mounted for pivotal movement relative to said arm about an axis passing through said spherical mounting, whereby said arm may be swung in a horizontal or vertical plane.

18. In a mowing machine, a tractor, a transverse rod pivoted at one end to said tractor, a generally longitudinal rod pivoted at one end to said tractor, the free ends of said rods being interconnected, a transmission housing pivotally mounted on said transverse rod, and adjustable means connecting said housing and longitudinal rod for positioning said housing in predetermined relation to said transverse rod.

19. A mowing machine comprising a tractor, a vertically movable support carried by the tractor, a transmission housing carried by said support and adjustable on said support about a transverse axis, a mowing arm, and means for mounting said mowing arm on said housing for relative upward swinging movement and for rearward swinging movement.

20. A mowing machine comprising a tractor, a vertically movable support carried by the tractor, a transmission housing carried by said support and adjustable on said support about a transverse axis, a mowing arm, means for mounting said mowing arm on said housing for relative upward swinging movement and for rearward swinging movement, and resilient means engaging said support and urging said support downwardly.

21. In a mowing machine, a vertically movable support, a mowing arm pivoted to said support for upward swinging movement, a lever on said mowing arm, a sheave on said support, a cable passing under said sheave and connected at one end to said lever, said cable passing upwardly beyond said sheave, and spring means tensioning said cable to partly counterbalance the weight of said support and the outer end of said mowing arm.

22. In a mowing machine, a tractor, a laterally extending mowing arm at one side of the tractor, and a support for said arm including a housing, a pivotal connection between the arm and housing, a frame including a rod extending transversely of and pivotally connected to the underside of the tractor, and a rod sleeved at its forward end on the rod aforesaid and extending longitudinally of the tractor at one side thereof, the last mentioned rod being angularly movably secured at its rear end to the adjacent side of the tractor, the housing being journaled upon the first mentioned rod, and cable and spring means connected in end-to-end relation to each other and to the housing and tractor respectively for yieldably carrying said frame.

23. In a mowing machine, a mowing arm mounted for both vertical and horizontal swinging movement, the mounting for the vertical swinging movement including a universal joint and a horizontal pivot spaced laterally apart, the mowing arm and horizontal pivot being movable as a unit in a horizontal plane about the universal joint, a longitudinally slidable arcuate rod connected to said horizontal pivot, an arcuate bearing for said rod, the axes of curvature of both the arcuate rod and bearing coinciding with the axis of the universal joint, and means for normally holding the mowing arm in its operative cutting position but yieldable when the mowing arm encounters an obstruction to permit said arm to swing horizontally about said universal joint, including a detent carried by the bearing and engageable with the arcuate rod.

24. In a mowing machine, a mowing arm having a shoe, a support for the arm including a housing, a universal joint connecting the shoe to the housing, and an arcuate rod carried by the housing and pivotally connected to the shoe in spaced relation to the universal joint whereby the arm and shoe as a unit may swing vertically about the universal joint and pivotal connection, the arcuate rod being slidable longitudinally relative to the housing so that the rod, pivotal connection, shoe and arm as a unit may swing horizontally about the universal joint.

25. In a mowing machine, a mowing arm having a shoe, a support for the arm including a housing, a universal joint connecting the shoe to the housing, an elongated member carried by the housing and pivotally connected to the shoe in spaced relation to the universal joint whereby the arm and shoe as a unit may swing vertically about the universal joint and pivotal connection, the elongated member being slidable longitudinally relative to the housing so that the rod, pivotal connection, shoe and arm as a unit may swing horizontally about the universal joint, means carried by the housing and engageable with the elongated member to hold the elongated member, pivotal connection, shoe and arm from horizontal movement but yieldable when the arm encounters an obstruction to permit such horizontal movement, and means carried by the elongated member and engageable with the housing to limit such horizontal movement.

26. In a mowing machine, a tractor, a housing carried by the tractor, a mowing arm, a universal joint connecting the arm to the housing, and a member slidably connected to the housing and pivotally connected to the arm, the pivotal connection cooperating with the universal joint to permit the arm to swing vertically relative to said housing and member, the sliding connection permitting limited horizontal movement of the member, pivotal connection and arm as a unit about the universal joint.

27. In a mower, a shoe support, a shoe, and laterally spaced pivotal connections between said shoe and support permitting vertical movement of the shoe relative to the support, one of said pivotal connections and shoe being slidably connected to the support so that the one pivotal connection mentioned and the shoe as a unit may move in a substantially horizontal direction relative to the other pivotal connection.

28. In a mower, a shoe support, a sleeve carried by said support, a shoe having a spherical mounting encircling the sleeve, a mowing arm connected to the shoe, a cutter bar carried by said arm, and driving means for the cutter bar including means journaled in said sleeve.

29. In a mower, a shoe support, a sleeve carried by said support, a shoe having a spherical mounting encircling the sleeve and having a separate pivotal connection with the support, a mowing arm connected to the shoe, a cutter bar carried by said arm, and a driving connection for said cutter bar including a drive shaft extending through the sleeve, the axis of the drive shaft being coincident with the axes of the spherical mounting and pivotal connection aforesaid.

30. In a mower, a tractor, a shoe support at one side of the tractor, a mowing arm connected to the shoe, a cutter bar carried by said arm, drive means for the cutter bar, an auxiliary housing for a part of said drive means, and means connecting the shoe support and auxiliary housing to the tractor including a bracket supporting the housing and adjustably connected to the tractor, and a rod terminally connected to said bracket and shoe support.

31. In a mower, a tractor, a shoe support at one side of the tractor, a mowing arm connected to said support, a cutter bar carried by said arm, means connecting the support to the tractor including two rods disposed at substantially right angles to each other and connected to the tractor and support, said support including a member mounted on one of said rods, and means for controlling the height of cut of the cutter bar including means for angularly adjusting the member about its supporting rod.

32. In a mower, a tractor, a shoe support at one side of the tractor, a mowing arm connected to said support, a cutter bar carried by said arm, means connecting the support to the tractor including two rods disposed at substantially right angles to each other and connected to the tractor and support, said support including a member mounted on one of said rods, and means for angularly adjusting the member about its supporting rod to tilt the mowing arm and cutter bar, including an upright arm secured to the shoe support, a sleeve upon the other of said rods, and a connection between the upright arm and said sleeve.

33. In a mower, a tractor, a cutter bar at one side of the tractor, means for driving the cutter bar from the power plant of the tractor, and means for raising and lowering the cutter bar relative to the tractor including means operable by the cutter drive means.

34. In a mower, a mowing arm, a cutter bar carried by the arm, means for driving the cutter bar, means for raising and lowering the cutter bar including a drum, and a cable connected to said drum and arm, a support for the drum, and means for maintaining the cable taut for all positions of the arm including a spiral spring connected to the support and drum and exerting a light turning effort upon the drum.

35. In a mower, a tractor, a mowing arm mounted at one side of the tractor to swing vertically, a cutter bar carried thereby, a bracket secured to the tractor, spring means for opposing the upward swinging movement of the arm, said spring means being also adapted to act upon the mowing arm to swing the same downwardly from its raised position and including an upright rigid with the arm, a rod connected to the upright and slidably engaging the bracket, a collar secured to the rod, and a coil spring sleeved on the rod and abutting the bracket and collar, the latter being positioned on the rod to place the spring under compression upon the upward swinging movement of the arm.

36. In a mowing machine, a tractor, a frame swingingly suspended from the tractor, a housing carried by said frame, a mower shoe, a universal joint connection between said mower shoe and housing, and a sliding hinge connection between the shoe and housing including an element substantially concentric and movable lengthwise in an arc substantially concentric with said universal joint.

37. In a mowing machine, a tractor, a frame angularly movably secured to said tractor, a housing journaled on a portion of said frame, a sleeve carried by said housing, a spherical member encircling the sleeve, a mower shoe mounted on said spherical member for both horizontal and vertical movement, a mower arm secured to and projecting laterally outward from said shoe, a cutter bar carried by said mower arm, and a driving connection between said tractor and cutter bar including a drive shaft extending axially of said sleeve.

38. In a mowing machine, a tractor, a spherical member carried by said tractor, a mowing arm mounted on said spherical member for both horizontal and vertical movement, a cutter bar extending longitudinally of said arm, and driving means for said cutter bar including means extending through the spherical member.

39. In a mowing machine, a tractor, a frame carried by the tractor, a housing carried by the frame, a spherical member carried by the housing, a mower shoe mounted on said spherical member for both vertical and horizontal swinging movement, a mower arm secured to said shoe and projecting laterally outward relative to said tractor, a cutter bar carried by said mower arm, and means for normally holding said mower arm at substantially right angles to the longitudinal center line of the tractor including means operable to permit limited horizontal swinging movement of said arm when the cutter bar strikes an obstruction.

40. In a mowing machine, a tractor, a frame carried by the tractor, a housing carried by the frame, a spherical member carried by the housing, a mower shoe mounted on said spherical member for both vertical and horizontal swinging movement, a mower arm secured to said shoe and projecting laterally outward relative to said tractor, a cutter bar carried by said mower arm, and means for normally holding said mower arm at substantially right angles to the longitudinal center line of the tractor including an arcuate rod slidably mounted on said housing in substantially concentric relation to the spherical member and hingedly connected to said shoe, and a detent carried by said housing engageable with said arcuate rod.

41. In a mowing machine, a tractor, a housing carried by the tractor, a spherical member carried by the housing, a mower shoe mounted on said spherical member for both horizontal and vertical swinging movement, a mower arm secured to said shoe and projecting laterally outward relative to the tractor, a cutter bar carried by said arm, and a driving connection between the tractor and cutter bar including a drive shaft extending axially through the spherical member.

42. In a mowing machine, a tractor, a bracket at one side and mounted to swing vertically relative to said tractor, a shaft journaled in the bracket, a spherical member mounted on the shaft, a mower shoe mounted on said spherical member, an arcuate arm slidably mounted on the bracket in substantially concentric relation to said spherical member, a hinge join' between said shoe and arm, a mower bar carried by the shoe and normally disposed at .ibstantially right angles to the longitudinal median line of the tractor, a cutter bar carried by the mower bar, and a driving connection between the shaft and cutter bar.

43. In a mowing machine, a tractor, a bracket at one side and mounted to swing vertically relative to said tractor, a shaft journaled in the bracket, a spherical member mounted on the shaft, a mower shoe mounted on said spherical member, an arcuate arm slidably mounted on the bracket in substantially concentric relation to said spherical member, a hinge joint between said shoe and arm, a mower bar carried by the shoe and normally disposed at substantially right angles to the longitudinal median line of the tractor, a cutter bar carried by the mower bar, a driving connection between the shaft and cutter bar, and means engageable with said arcuate arm for maintaining the mower bar in its normal right angular position relative to the tractor but adapted when said cutter bar strikes an obstruction to release the arcuate arm so that the arm, mower bar and cutter bar may move in unison in an arc about the spherical member.

44. In a mowing machine, a tractor having a power take-off shaft, a bracket at one side of the tractor and hingedly connected thereto for vertical swinging movement, a mower shoe mounted to swing vertically on the bracket, a mower arm secured to the shoe so as to swing therewith, a winding drum operatively connected to the power take-off shaft, a pulley mounted on the bracket, a pulley spaced vertically above the pulley just mentioned and mounted on the adjacent side of the tractor, a vertically extending bracket fixed to the shoe at a point spaced laterally outward from the lower pulley, the upper end of said vertically extending bracket normally being slightly above the axis of rotation of the lower pulley, and a cable connected to the drum and reeved over the upper pulley, under the lower pulley and secured to said vertically extending bracket.

45. In a mowing machine, a tractor having a power take-off shaft, a bracket at one side of the tractor and hingedly connected thereto for vertical swinging movement, a mower shoe mounted to swing vertically on the bracket, a mower arm secured to the shoe so as to swing therewith, a winding drum operatively connected to the power take-off shaft, a pulley mounted on the bracket, a pulley spaced vertically above the pulley just mentioned and mounted on the adjacent side of the tractor, and a cable connected to the drum and reeved over the upper pulley, under the lower pulley and secured to said mower shoe.

46. In a mowing machine, a tractor, a bracket supported on one side of the tractor for swinging movement in a vertical plane, a pulley carried by said bracket, a mower shoe pivoted to the bracket for swinging movement relative thereto in a vertical plane, a pulley carried by the tractor above the pulley aforesaid, means for swinging the shoe in a vertical plane including a cable having one end fixed to the mower shoe, having a portion extending around the underside of the first pulley and over the second pulley, and power driven means connected to the opposite end of the cable.

47. In a mowing machine, a tractor, a bracket supported on the tractor at one side thereof for vertical swinging movement, a mower shoe pivoted to the bracket for swinging movement relative thereto in a vertical plane, a bracket fixed to the tractor, pulleys mounted on the two brackets, one on each bracket, a cable having one end portion extending over the pulley on the second bracket and extending around the underside of the pulley on the first bracket, means for anchoring the said end of the cable to the mower shoe, and means operatively connected to the opposite end of the cable for actuating the latter.

48. In a mowing machine, a tractor, a bracket supported from the tractor for vertical swinging movement relative thereto, a mower shoe beside the bracket, and laterally spaced connections between the shoe and bracket, one being a universal connection, and the other being a pivotal connection, the pivotal connection including a member slidable relative to the bracket in an arc substantially concentric with the universal connection.

49. In a mowing machine, a tractor, a bracket supported from the tractor, a mower shoe beside the bracket, laterally spaced connections between the shoe and bracket, one being a universal connection and the other being a pivotal connection, the pivotal connection including a member slidable relative to the bracket in an arc substantially concentric with the universal connection, and means carried by said member and engageable with the bracket to limit sliding movement of the said member, said means being yieldable to cushion or absorb any shock that may be introduced by limiting the sliding movement of the member.

50. In a mowing machine, a tractor, a bracket supported from the tractor, a mower shoe beside the bracket, a universal connection between the shoe and bracket, a mower arm secured to the shoe, a blade carried by the arm, and a driving connection between the tractor and blade including a shaft extending axially of the universal connection.

ROBERT W. WAGNER.